United States Patent
Chang (10) Patent No.: US 9,745,730 B2
(45) Date of Patent: Aug. 29, 2017

(54) TOILET TANK STRUCTURE (71) Applicant: Shun-Jie Chang, Taichung (TW)

(72) Inventor: Shun-Jie Chang, Taichung (TW)

(*) Notice: Subject to any disclaimer, the term of this patent is extended or adjusted under 35 U.S.C. 154(b) by 14 days.

(21) Appl. No.: 14/957,381

(22) Filed: Dec. 2, 2015

(65) Prior Publication Data

US 2017/0121954 A1 May 4, 2017

(30) Foreign Application Priority Data

Nov. 4, 2015 (TW) .............................. 104136391 A (51) Int. Cl.
| E03D 5/00 | (2006.01) |
| E03D 1/00 | (2006.01) |
| E03C 1/01 | (2006.01) |
| E03D 1/22 | (2006.01) |

(52) U.S. Cl.
CPC ................ *E03D 5/006* (2013.01); *E03C 1/01* (2013.01); *E03D 1/003* (2013.01); *E03D 1/22* (2013.01)

(58) Field of Classification Search
CPC ......... E03D 5/003; E03D 5/006; E03D 1/003; E03D 1/22; E03C 1/01
USPC ................... 4/317, 363, 364, 415, 664, 665
See application file for complete search history.

(56) References Cited

U.S. PATENT DOCUMENTS

| 3,820,170 | A | * | 6/1974 | Kern | ......................... E03D 1/14 4/415 |
| 4,358,864 | A | * | 11/1982 | Medrano | ................. E03D 1/003 4/346 |
| 4,388,737 | A | * | 6/1983 | Wenzel | ................... E03D 1/142 4/324 |
| 9,057,186 | B1 | * | 6/2015 | Augustine | ............... E03D 1/003 |
| 2010/0058524 | A1 | * | 3/2010 | Wajda | ....................... E03D 1/22 4/326 |
| 2011/0167551 | A1 | * | 7/2011 | Garza Laguera Garza | ..................... E03D 1/003 4/353 |
| 2013/0055496 | A1 | * | 3/2013 | Yyoshioka | .............. E03D 1/003 4/324 |
| 2015/0240467 | A1 | * | 8/2015 | Davis | ...................... E03D 5/006 4/324 |

* cited by examiner

*Primary Examiner* — J. Casimer Jacyna
(74) *Attorney, Agent, or Firm* — Ming Chow; Sinorica, LLC (57) ABSTRACT

A toilet tank structure is formed by a primary-secondary water tank set, a tap water inlet control valve, a secondary water tank inlet control valve and a flush control module, and the tap water inlet control valve, the secondary water tank inlet control valve and the flush control module are provided for controlling the flushing and water supply to minimize the waste of water resources effectively, so as to achieve the effects of saving water and improving functionality.

6 Claims, 8 Drawing Sheets

TOILET TANK STRUCTURE

The current application claims a foreign priority to application number 104136391 filed on Nov. 4, 2015 in Taiwan.

FIELD OF THE INVENTION

The present invention relates to a toilet tank structure, and more particularly to a water saving device of a toilet.

BACKGROUND OF THE INVENTION

Figure 8:
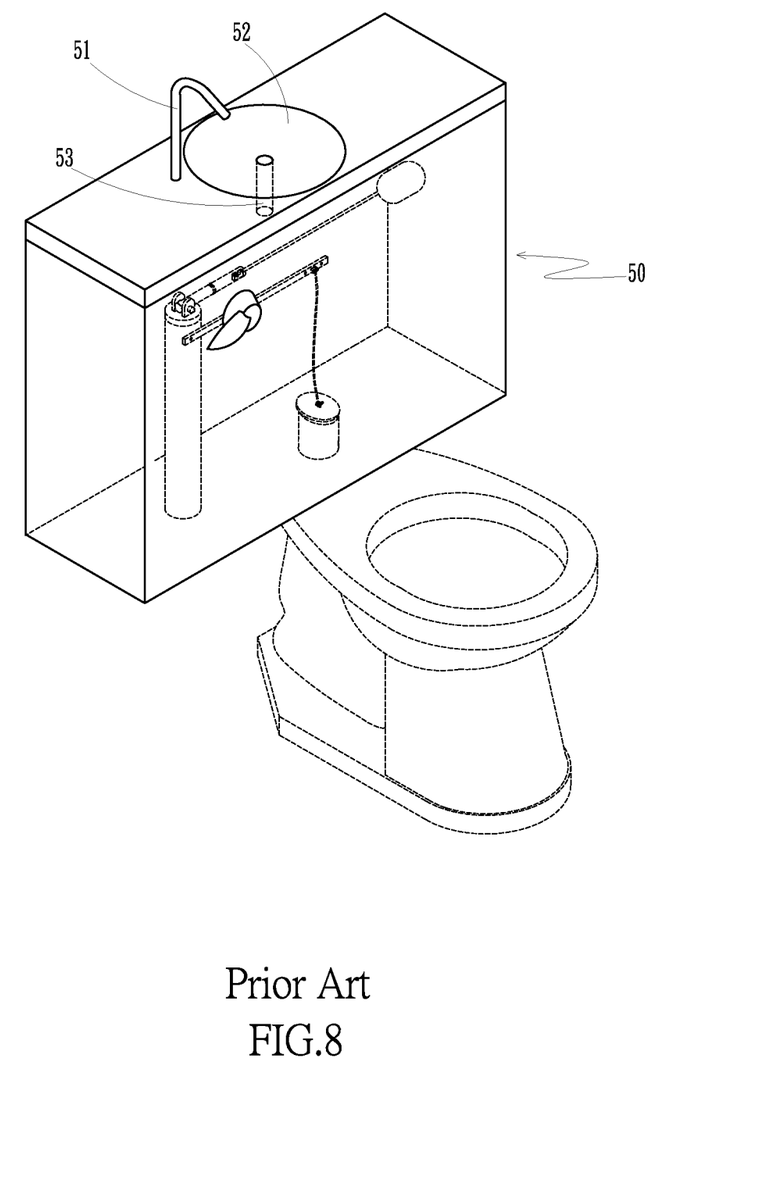
FIG. 8 is a schematic view of a conventional water-saving toilet structure.

With reference to FIG. 8 for a conventional toilet tank structure, the structure comprises a toilet tank 50 having a sink 51 and a faucet 52, and the water supply of the faucet 52 is linked with the toilet flushing, so that when a toilet is flushed, the faucet 52 is linked to output water for washing hands after using the toilet, and the waste water produced after washing hands is drained through a drain pipe 53 of the sink 51 and stored in the toilet tank 50. When it is necessary to wash hands without using the toilet, the faucet 52 only supplies water if the toilet is flushed. As a result, the water resource is wasted, and the use is inconvenient. Obviously, the conventional toilet tank requires improvements.

SUMMARY OF THE INVENTION

In view of the aforementioned drawbacks of the conventional toilet structure, it is a primary objective of the present invention to provide a toilet tank structure to overcome the drawbacks of the prior art.

To achieve the aforementioned objective, the present invention provides a toilet tank structure, comprising a primary-secondary water tank set, a tap water inlet control valve, a secondary water tank inlet control valve and a flush control module, wherein the primary-secondary water tank set includes a primary water tank, a secondary water tank, a tank cover and an outlet pipe, and the primary water tank has a water inlet and a primary tank outlet formed at the bottom of the primary water tank, and the secondary water tank includes a lower secondary water tank and an upper secondary water tank cover, and the lower secondary water tank has a water inlet formed at a lower edge of the lower secondary water tank, and the lower secondary water tank has a secondary water tank outlet, and an air-flow column is formed at the upper secondary water tank cover and penetrates through the top of the upper secondary water tank cover, and an air-flow chamber is formed under the air-flow column and opposite to the lower secondary water tank, and the periphery of the upper secondary water tank cover has a latch engaging ring edge, and the inner side of the latch engaging ring edge has an anti-leak gasket, and an open edge of the lower secondary water tank and the latch engaging ring edge of the upper secondary water tank cover are latched and coupled to each other and closely connected by an anti-leak gasket for preventing leakage, and the upper secondary water tank cover and the lower secondary water tank are latched and combined with each other, and the secondary water tank is disposed in the primary water tank, and the secondary water tank outlet of the secondary water tank and the primary tank outlet of the primary water tank are configured to be opposite to each other and latched and fixed by an outlet pipe, and the tank cover is covered onto an opening at the top of the primary water tank, and the support stand is latched and fixed to the bottom and rear of the primary water tank, and the tap water inlet control valve has a support rod and a water control ferrule, and the support rod has a fixing end and a pivoting end, and the fixing end has a fixing hole, and the fixing end has a sealing plug slidably installed to the fixing end, and the pivoting end has a horizontal floating plate pivotally coupled to the pivoting end and an edge of the water control ferrule has two water outlets penetrating through each other, and the top of the two water outlets of the water control ferrule has a plurality of notches, and two pivoting lugs are disposed between the water outlet on one side and the opposite notch, and the pivoting lug has a pivot column, and the sealing plug is accommodated in the water control ferrule, and the sealing plug a water outlet formed opposite to an edge of the water control ferrule, and the fixing hole of the fixing end is disposed opposite to the pivoting lug and pivotally coupled to the pivot column, and the fixing end is slidably latched to the corresponsive notch, and the secondary water tank inlet control valve has a support rod and a water control ferrule, and the support rod has a fixing end and a pivoting end, and the fixing end has a fixing hole, and the fixing end has a sealing plug slidably installed thereto, and the pivoting end has a horizontal floating plate pivoted to the pivoting end, and an edge of the water control ferrule has two water outlets penetrating through each other, and the top of the two water outlets of the water control ferrule has plurality of notches disposed opposite to each other, and two pivoting lugs are disposed between the water outlet on one side and the corresponsive notch, and the pivoting lug has a pivot column, and the sealing plug is accommodated in the water control ferrule, and the sealing plug has a water outlet formed opposite to an edge of the water control ferrule, and the fixing hole of the fixing end is disposed opposite to the pivoting lug and pivotally coupled by the pivot column, and the fixing end is slidably latched to the corresponsive notch. The flush control module has a fixed column, a sealing-ball cover pivoted to the bottom of the fixed column, and a pull string coupled to the sealing-ball cover, and an end of the pull string is coupled to a control handle linking rod, and the water control ferrule of the tap water inlet control valve is fixed to a water inlet formed at the bottom of the primary water tank of the primary-secondary water tank set, and the water control ferrule of the secondary water tank inlet control valve is fixed to the water inlet formed at the bottom of an edge of the secondary water tank, and the fixed column of the flush control module is fixed into the secondary water tank, and the sealing-ball cover has a secondary water tank outlet configured to be corresponsive to the bottom of the secondary water tank, linked and coupled to the pull string of the sealing-ball cover, and passed out from an air-flow column of the upper secondary water tank cover of the secondary water tank, and the control handle linking rod fixed to the other end of the pull string is pivotally coupled to an edge near the top of the front of the primary water tank in a flipping manner. By pressing the control handle linking rod of the flush control module, the control handle linking rod is linked to the pull string and sealing-ball cover, so that the sealing-ball cover is opened with respect to the outlet pipe to guide the water stored in the secondary water tank out of the outlet pipe to flush the toilet. When the water level in the secondary water tank drops, the horizontal floating plate of the secondary water tank inlet control valve is linked to the L-shaped support rod to drive the sealing plug, so that the sealing plug is released from the situation of covering the water outlet of the water control ferrule, so as to introduce the water stored in the primary water tank into the secondary water tank. If the water stored in the secondary water tank reaches a predetermined level, the secondary water tank inlet control valve will stop inputting water. If the water stored in the primary water tank is filled into the secondary water tank, and the water level of the primary water tank drops, rainwater or recycled water is supplied into the primary water tank. If the rainwater or recycled water cannot be supplied, then the horizontal floating plate of the tap water inlet control valve will be linked with the L-shaped support rod to drive the sealing plug, so that the sealing plug is released from the situation of covering the water outlet of the water control ferrule in order to introduce tap water into the primary water tank. If the water stored in the primary-secondary water tank set reaches a predetermined level, then the tap water inlet control valve will stop inputting water to reduce the waste of water resources effectively.

In addition, the air-flow column and the air-flow chamber of the secondary water tank balance the pressure of the stored water, so that the flushing operation will be smooth. Further, the tank cover has a wastewater inlet for guiding used wastewater into the primary water tank for the reuse of the wastewater. If excessive water is supplied into the primary water tank, the excessive water will be guided and recycled from the overflow duct of the overflow port. In addition, the tank cover has a basin portion and a faucet disposed at the top of the tank cover, a telescopic pipe disposed at the bottom of the basin portion, a plurality of slides disposed at the rear of the tank cover, a plurality of hinge plates disposed on the rear edge of the top of the tank cover, and a plurality of rails disposed at the top of the support stand of the primary-secondary water tank set, and the plurality of slides disposed at the rear side of the tank cover and the plurality of rails of the support stand are slidably coupled to each other, and the other end of the plurality of hinge plates disposed at the rear side of the top of the tank cover is fixed and coupled to the rear side of the plurality of rails of the support stand, so that the tank cover may be moved transversally sideway and lifted backward, and when the tank cover is moved transversally, the telescopic pipe is pulled to recycle wastewater in the primary water tank, so as to achieve better water-saving and functional effects.

DESCRIPTION OF THE PREFERRED EMBODIMENTS

The technical characteristics, contents, advantages and effects of the present invention will be apparent with the detailed description of a preferred embodiment accompanied with related drawings as follows. The drawings are provided for the illustration, and same numerals are used to represent respective elements in the preferred embodiments. It is intended that the embodiments and drawings disclosed herein are to be considered illustrative rather than restrictive. Same numerals are used for representing same respective elements in the drawings.

With reference to FIGS. 1 to 4 for a perspective view of a toilet tank structure of the present invention, a partial exploded view of a tap water inlet control valve of the present invention, a partial exploded view of a secondary water tank inlet control valve, and a sectional view of the secondary water tank inlet control valve respectively, the toilet tank structure comprises the following elements:

A primary-secondary water tank set 10 includes a primary water tank 11, a secondary water tank 12, a tank cover 13, an outlet pipe 14 and a support stand 15, wherein the bottom of the primary water tank 11 has a water inlet 110 and a primary tank outlet 111, and the top of an edge of the primary water tank 11 has an overflow port 112, and the overflow port 112 has an overflow duct 112A fixed thereto, and the secondary water tank 12 includes a lower secondary water tank 120 and an upper secondary water tank cover 121, and the bottom of an edge of the lower secondary water tank 120 has a water inlet 120A, and the bottom of the lower secondary water tank 120 has a secondary water tank outlet 120B, and the top of the upper secondary water tank cover 121 has an air-flow column 121A penetrating through the upper secondary water tank cover 121, and the bottom of the air-flow column 121A has an air-flow chamber 121B disposed opposite to the lower secondary water tank 120, and the periphery of the upper secondary water tank cover 121 has a latch engaging ring edge 121C, and an inner side of the latch engaging ring edge 121C has an anti-leak gasket, and the open edge of the lower secondary water tank 120 and the of the latch engaging ring edge 121C of the upper secondary water tank cover 121 are latched and coupled to each other and combined closely by the anti-leak gasket for preventing leakage. In addition, the lower secondary water tank 120 and the upper secondary water tank cover 121 have a plurality of corresponsive latches 120C, 121D, and the latches 120C, 121D of the lower secondary water tank 120 and the upper secondary water tank cover 121 are latched with each other, and the secondary water tank 12 is disposed in the primary water tank 11, and the secondary water tank outlet 120B of the secondary water tank 12 and the primary tank outlet 111 of the primary water tank 11 are configured opposite to each other and fixed and coupled by the outlet pipe 14, and the tank cover 13 is covered onto an opening formed at the top of the primary water tank 11, and the support stand 15 is latched and fixed to the bottom and rear of the primary water tank 11.

Figure 1:
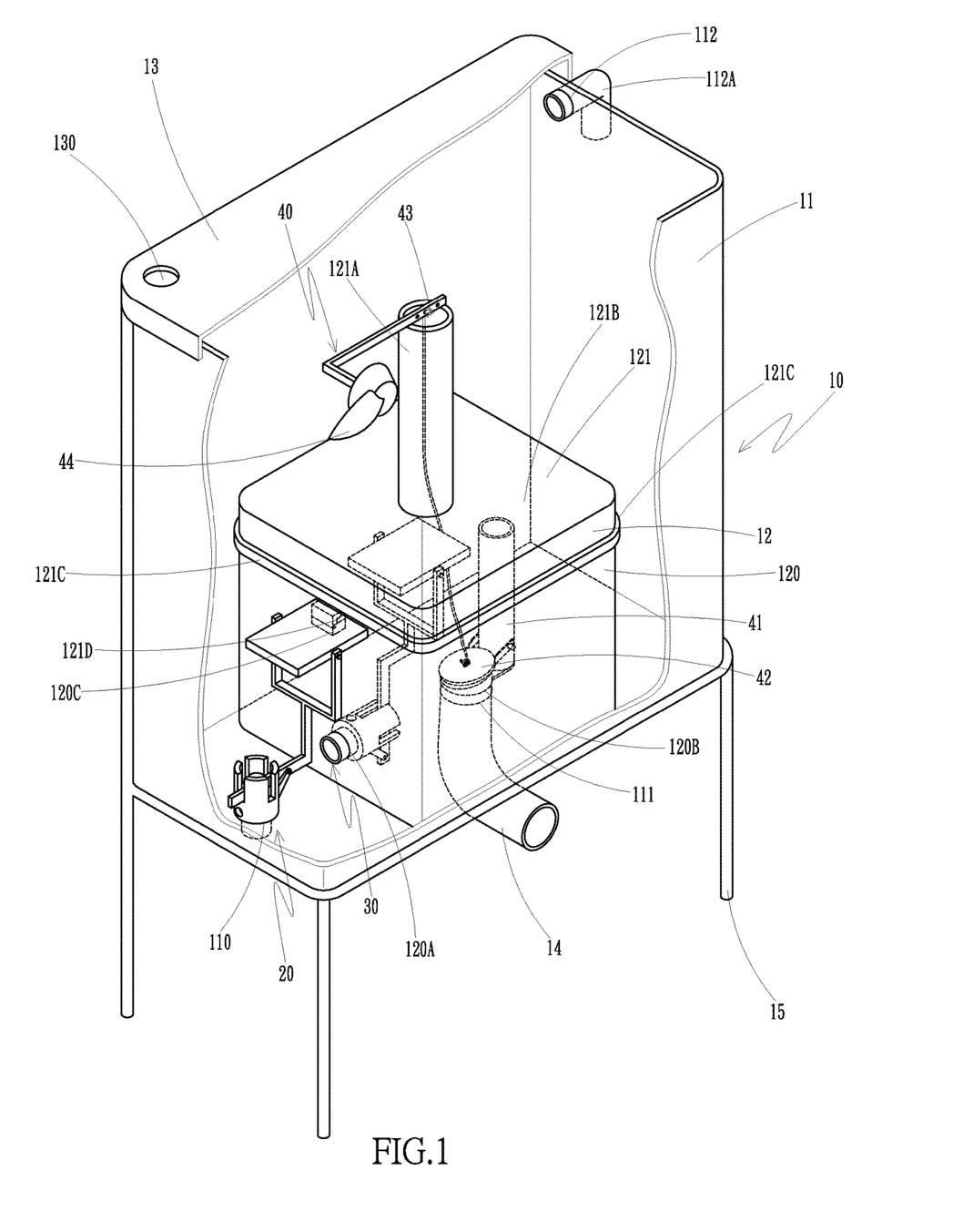
FIG. 1 is a perspective view of the present invention.
Figure 2:
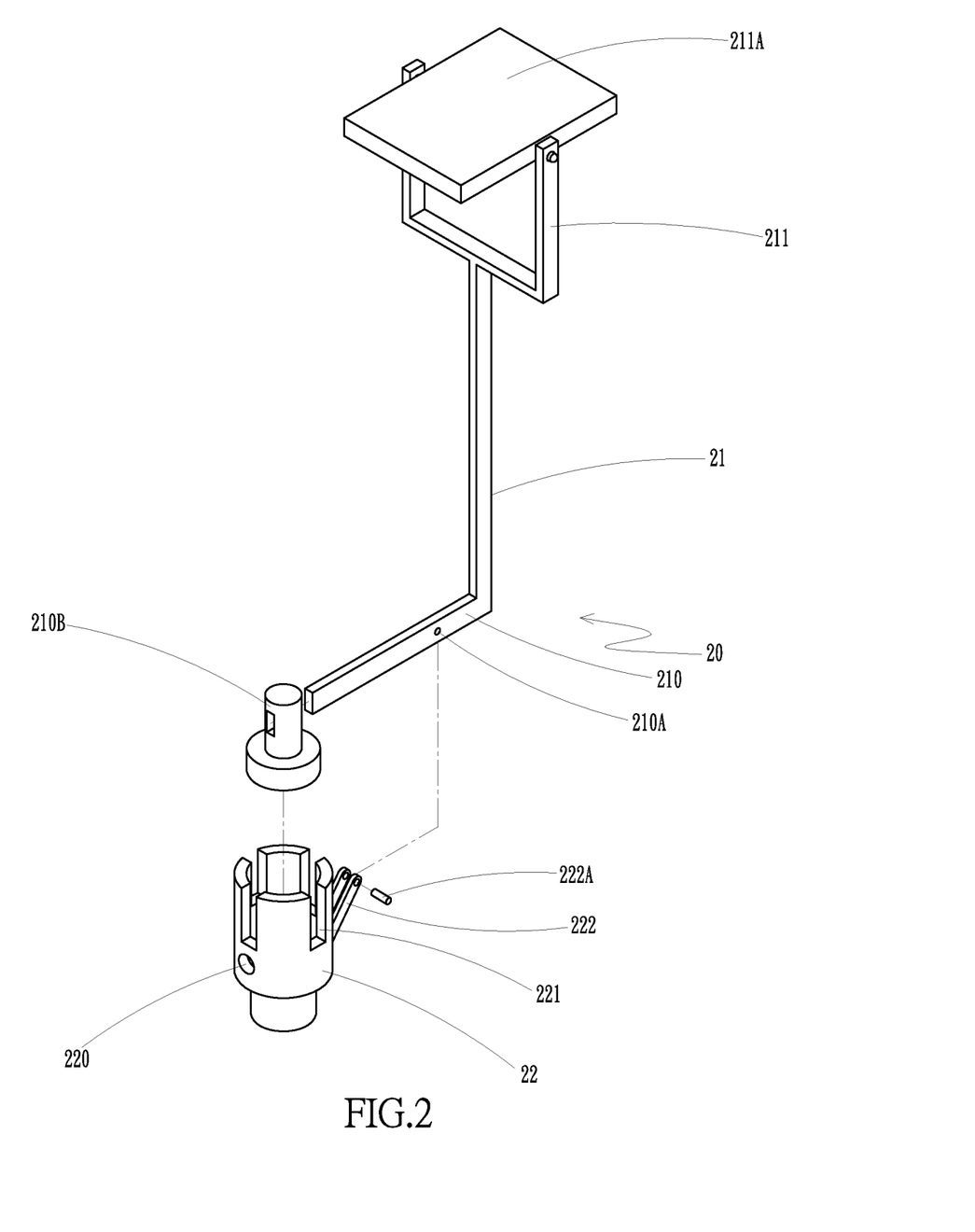
FIG. 2 is a partial exploded view of a tap water inlet control valve of the present invention.

A tap water inlet control valve 20 includes a support rod 21 and a water control ferrule 22, and the support rod 21 has a fixing end 210 and a pivoting end 211, and the fixing end 210 has a fixing hole 210A, and the fixing end 210 has a sealing plug 210B, and the pivoting end 211 is pivotally coupled to a horizontal floating plate 211A, and an edge of the water control ferrule 22 has two water outlets 220 penetrating through each other, and the top of the two water outlets 220 of the water control ferrule 22 has a plurality of notches 221, and two pivoting lugs 222 are disposed between the water outlet 220 on one side and the corresponsive notch 221, and the pivoting lug 222 has a pivot column 222A, and the sealing plug 210B is accommodated in the water control ferrule 22, and the sealing plug 210B has a water outlet 220 disposed opposite to an edge of the water control ferrule 22, and the fixing hole 210A of the fixing end 210 is disposed opposite to the pivoting lug 222 and pivotally coupled and fixed by the pivot column 222A, and the fixing end 210 is slidably latched to the corresponsive notch 221, and the water control ferrule 22 is fixed to a water inlet 110 formed at the bottom of the primary water tank 11 of primary-secondary water tank set 10.

Figure 3:
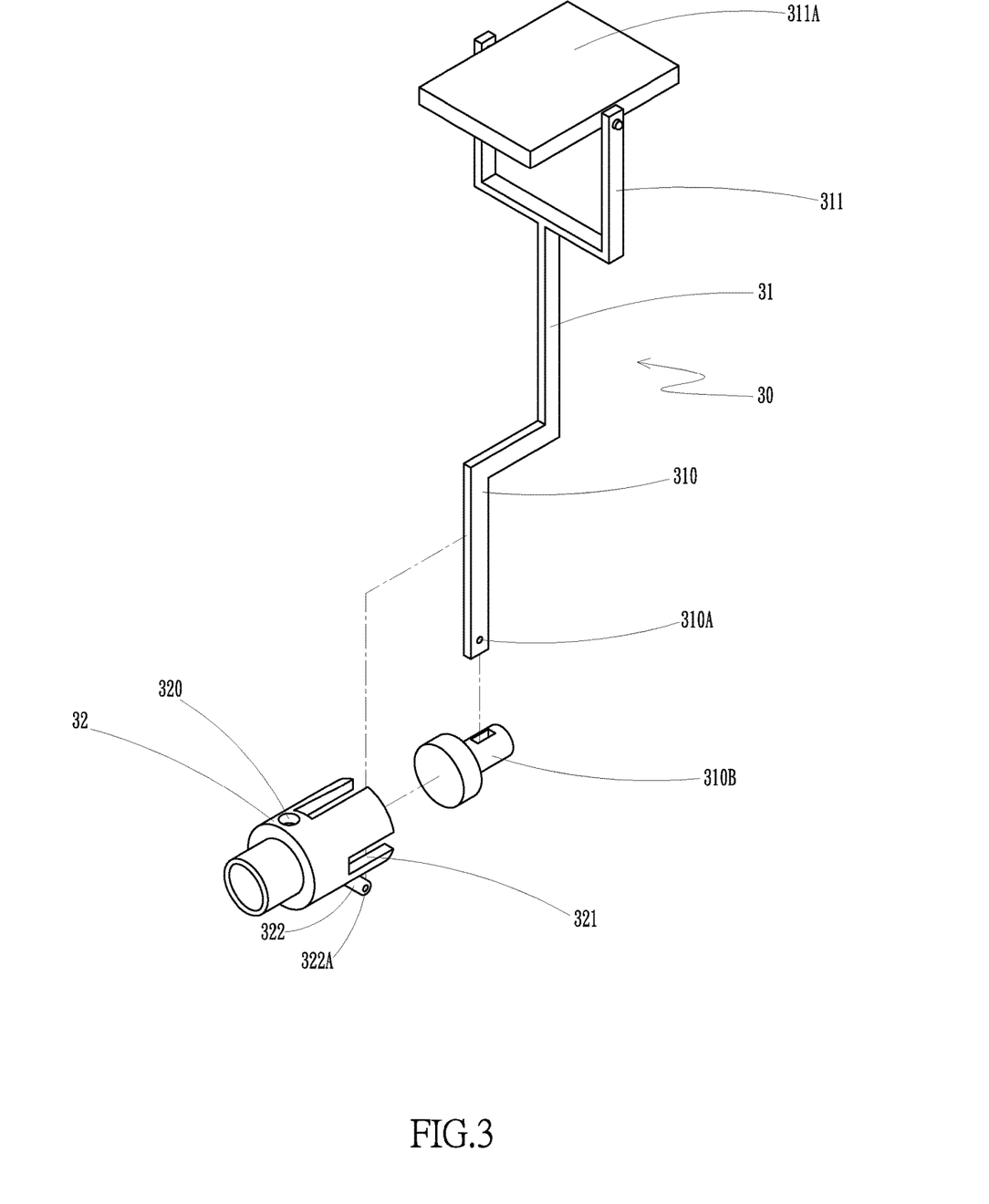
FIG. 3 is a partial exploded view of a secondary water tank inlet control valve of the present invention.

A secondary water tank inlet control valve 30 includes a support rod 31 and a water control ferrule 32, and the support rod 31 has a fixing end 310 and a pivoting end 311, and the fixing end 310 has a fixing hole 310A, and a sealing plug 310B is slidably installed to the fixing end 310, and the pivoting end 311 is pivoted to a horizontal floating plate 311A, and an edge of the water control ferrule 32 has two water outlets 320 penetrating through each other, and the top of the two water outlets 320 of the water control ferrule 32 has a plurality of notches 321 disposed opposite to each other, and two pivoting lugs 322 are disposed between the water outlet 320 on one side and the corresponsive notch 321, and the pivoting lug 322 has a pivot column 322A, and the sealing plug 310B is accommodated in the water control ferrule 32, and the sealing plug 310B has a water outlet 320 configured to be corresponsive to an edge of the water control ferrule 32, and the fixing hole 310A of the fixing end 310 is configured to be corresponsive to the pivoting lug 322 and pivotally coupled and fixed by the pivot column 322A, and the fixing end 310 is slidably latched to the corresponsive notch 321, and the water control ferrule 32 is fixed to the water inlet 120A formed at the bottom of an edge of the secondary water tank 12.

Figure 4:
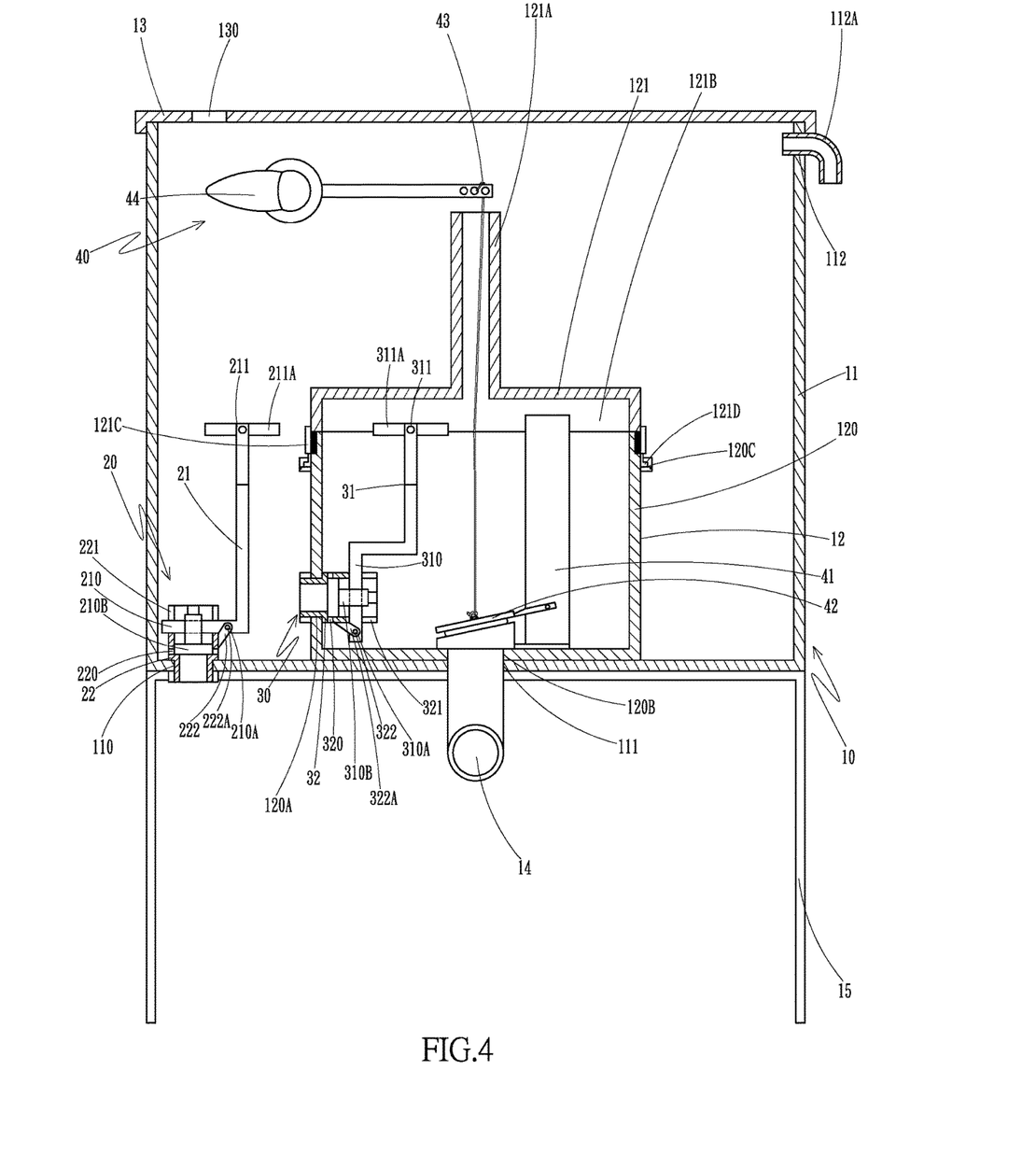
FIG. 4 is a sectional view of the present invention.
Figure 5:
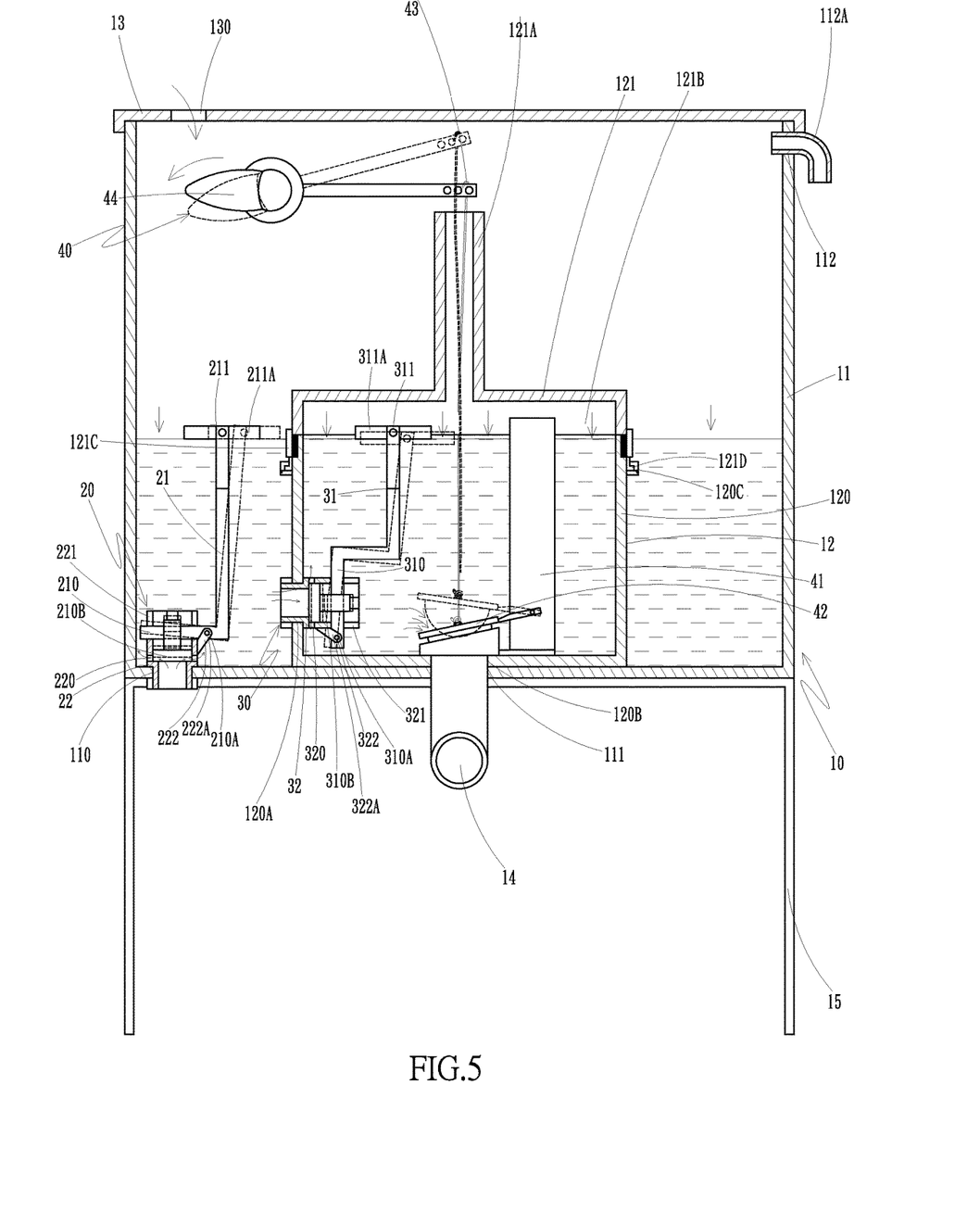
FIG. 5 is a sectional view showing the operation of the present invention.

A flush control module 40 includes a fixed column 41, a sealing-ball cover 42 pivoted to the bottom of the fixed column 41, and a pull string 43 coupled to the sealing-ball cover 42, and an end of the pull string 43 is coupled to a control handle linking rod 44, and the fixed column 41 is fixed into the secondary water tank 12, and the sealing-ball cover 42 has a secondary water tank outlet 120B configured to be corresponsive to the bottom of the secondary water tank 12, linked and combined with the pull string 43 of the sealing-ball cover 42, and passed out from the air-flow column 121A of the upper secondary water tank cover 121 of the secondary water tank 12, and the control handle linking rod 44 fixed to the other end of the pull string 43 is pivoted to an edge near the top of the front of the primary water tank 11 in a flipping manner.

By the aforementioned components, the toilet tank structure of the present invention is formed.

With reference to FIGS. 1 to 5 for a perspective view of a toilet tank structure of the present invention, a partial exploded view of a tap water inlet control valve of the present invention, a partial exploded view of a secondary water tank inlet control valve of the present invention, a sectional view of the present invention, and a sectional view showing the operation of the toilet tank structure of the present invention respectively, the water control ferrule 22 of the tap water inlet control valve 20 is fixed and combined with the water inlet 110 formed at the bottom of the primary water tank 11 of the primary-secondary water tank set 10, and the water control ferrule 32 of the secondary water tank inlet control valve 30 is fixed and combined with the water inlet 120A formed at the bottom of an edge of the secondary water tank 12, and the fixed column 41 of the flush control module 40 is fixed into the secondary water tank 12, and the sealing-ball cover 42 is configured to be corresponsive to the secondary water tank outlet 120B formed at the bottom of the secondary water tank 12, linked and combined with the pull string 43 of the sealing-ball cover 42, and passed out from the air-flow column 121A of the upper secondary water tank cover 121 of the secondary water tank 12, and the control handle linking rod 44 fixed to the other end of the pull string 43 is pivoted to an edge near the top of the front of the primary water tank 11 in a flipping manner. By pressing the control handle linking rod 44 of the flush control module 40, the control handle linking rod 44 is linked with the pull string 43 and the sealing-ball cover 42, so that the sealing-ball cover 42 is opened with respect to the outlet pipe 14 to guide water stored in the secondary water tank 12 into the toilet from the outlet pipe 14 to flush the toilet. When the water level of the secondary water tank 12 drops, the horizontal floating plate 311A of the secondary water tank inlet control valve 30 is linked with the support rod 31 to drive the sealing plug 310B, so that the sealing plug 310B is released from the situation of covering the water outlet 320 of the water control ferrule 32 to introduce water stored in the primary water tank 11 into the secondary water tank 12. If the water stored in the secondary water tank 12 reaches a predetermined level, the secondary water tank inlet control valve 30 will stop inputting water, and the water stored in the primary water tank 11 will be filled into the secondary water tank 12. When the water level of the primary water tank 11 drops, recycled rainwater or water will be supplied into the primary water tank 11. If the recycled rainwater or water cannot be filled, then the horizontal floating plate 211A of the tap water inlet control valve 20 will link with the support rod 21 to drive the sealing plug 210B, so that the sealing plug 210B is released from the situation of covering the water outlet 220 of the water control ferrule 22 to introduce tap water into the primary water tank 11. If the water stored in the primary water tank 11 reaches the predetermined level, then the tap water inlet control valve 30 will stop inputting water to reduce the waste of water resources effectively. In addition, the air-flow column 121A and the air-flow chamber 121B of the secondary water tank 12 are provided for balancing the pressure of the water stored in the secondary water tank 12, so as to provide a smooth flushing effect. Further, the tank cover 13 includes a wastewater inlet 130 for introducing used wastewater into the primary water tank 11 to reuse the wastewater. If excessive water is supplied into the primary water tank 11, the excess water will be guided out from the overflow duct 112A of the overflow port 112 and recycled to achieve better water saving and functional effects.

Figure 6:
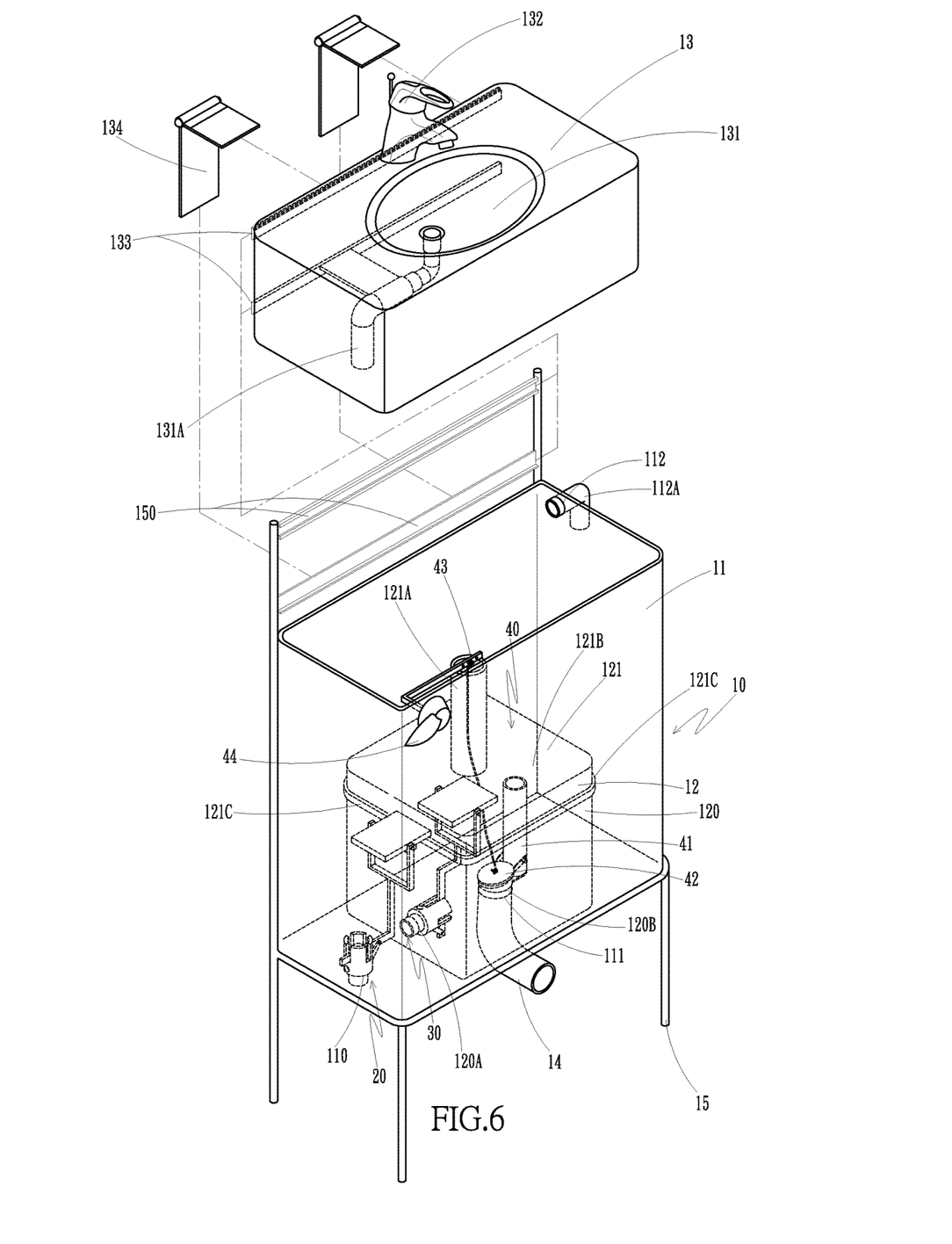
FIG. 6 is a schematic view of a tank cover having a basin portion at the top of the tank cover in accordance with a preferred embodiment of the present invention.
Figure 7:
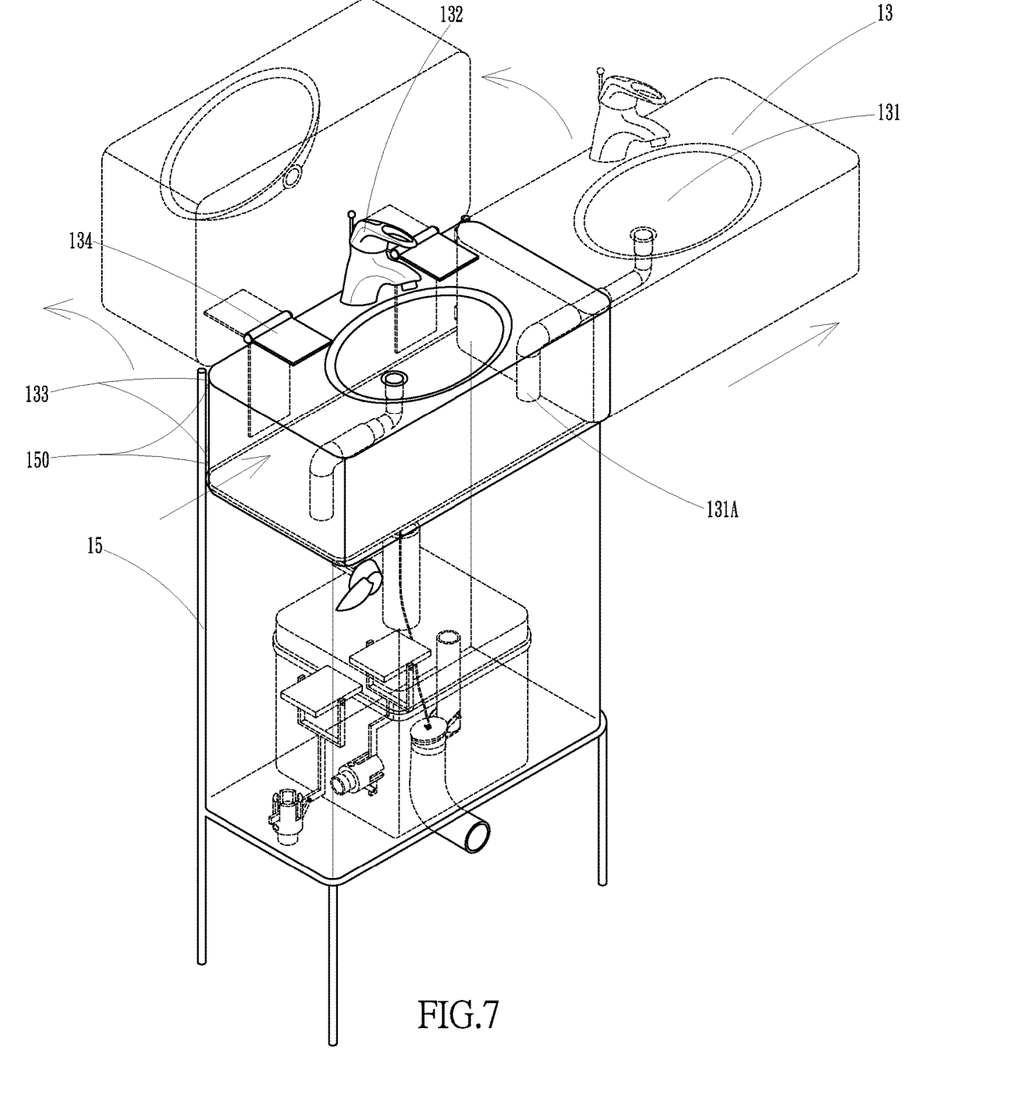
FIG. 7 is a schematic view showing the transversally moving and lifting operation in accordance with a preferred embodiment of the present invention.

With reference to FIGS. 6 and 7 for a schematic view of a tank cover having a basin portion at the top of the tank cover in accordance with a preferred embodiment of the present invention and a schematic view showing the transversally moving and lifting operation in accordance with a preferred embodiment of the present invention respectively, the overall structure of the present invention is substantially the same as those shown in FIGS. 1 to 5 except that the top of the tank cover 13 further has a basin portion 131 and a faucet 132, and the bottom of the basin portion 131 is coupled to a telescopic pipe 131A, and the rear side of the tank cover 13 has a plurality of slides 133, and the rear edge of the top of the tank cover 13 has a plurality of hinge plates 134, and the top of the support stand 15 of the primary-secondary water tank set 10 has a plurality of rails 150, and the plurality of slides 133 disposed at the rear of the tank cover 13 and the plurality of rails 150 disposed at the support stand 15 are slidably combined with each other, and the plurality of hinge plates 134 disposed at the rear edge of the top of the tank cover 13 and the rear side of the plurality of rails 150 of the support stand 15 are fixed and combined, so that the tank cover 13 may be moved transversally sideway and lifted backward. When the tank cover 13 is moved transversally, the telescopic pipe 131A is pulled, so that the corresponsive primary water tank 11 recycles the wastewater to provide a more practical application of the present invention.

What is claimed is:

1. A toilet tank structure; comprising:
a primary-secondary water tank set
the primary-secondary water tank set comprising a primary water tank, a secondary water tank, a tank cover and an outlet pipe;
the primary water tank comprising a water inlet and a primary tank outlet, the water inlet and the primary tank outlet of the primary water tank being formed on a bottom of the primary water tank;
the secondary water tank comprising a lower secondary water tank and an upper secondary water tank cover;
the lower secondary water tank comprising a water inlet, the water inlet of the lower secondary water tank being formed on a lower edge of the lower secondary water tank;
the lower secondary water tank comprising a secondary water tank outlet;
an air-flow column;
the air-flow column being formed on the upper secondary water tank cover and penetrating through a top of the upper secondary water tank cover;
an air-flow chamber;
the air-flow chamber being formed under the air-flow column and opposite to the lower secondary water tank;
the upper secondary water tank cover and the lower secondary water tank being latched and combined with each other;
the secondary water tank being disposed in the primary water tank;
the secondary water tank outlet of the secondary water tank and the primary tank outlet of the primary water tank being configured to be opposite to each other and latched and fixed by the outlet pipe;
the tank cover being covered onto an opening at a top of the primary water tank;
a tap water inlet control valve;
the tap water inlet control valve comprising a support rod and a water control ferrule;
the support rod of the tap water inlet control valve comprising a fixing end and a pivoting end;
the fixing end of the support rod of the tap water inlet control valve comprising a fixing hole formed thereon;
the fixing end of the support rod of the tap water inlet control valve comprising a sealing plug slidably installed thereon;
the pivoting end of the support rod of the tap water inlet control valve comprising a horizontal floating plate pivoted thereto;
the water control ferrule of the tap water inlet control valve comprising two water outlets penetrating each other and formed on a lateral side thereof, a plurality of notches formed adjacent to the two water outlets of the water control ferrule of the tap water inlet control valve, and two pivoting lugs disposed between the water outlet and the notch of the water control ferrule of the tap water inlet control valve;
the pivoting lug of the water control ferrule of the tap water inlet control valve comprising a pivot column;
the sealing plug of the fixing end of the support rod of the tap water inlet control valve being accommodated in the water control ferrule of the tap water inlet control valve;
the sealing plug of the fixing end of the support rod of the tap water inlet control valve comprising a water outlet, the water outlet of the sealing plug of the fixing end of the support rod of the tap water inlet control valve being formed at a position opposite to an edge of the water control ferrule of the fixing end of the support rod of the tap water inlet control valve;
the fixing hole of the fixing end of the support rod of the tap water inlet control valve being configured to be opposite to the pivoting lug of the water control ferrule of the tap water inlet control valve and pivotally fixed by the pivot column of the pivoting lug of the water control ferrule of the tap water inlet control valve;
the fixing end of the support rod of the tap water inlet control valve being slidably latched to a corresponsive notch among the plurality of notches of the water control ferrule of the tap water inlet control valve;
the water control ferrule of the tap water inlet control valve being fixed and coupled to the water inlet of the primary water tank;
a secondary water tank inlet control valve;
the secondary water tank inlet control valve comprising a support rod and a water control ferrule;
the support rod of the secondary water tank inlet control valve comprising a fixing end and a pivoting end;
the fixing end of the support rod of the secondary water tank inlet control valve comprising a fixing hole;
the fixing end of the support rod of the secondary water tank inlet control valve comprising a sealing plug slidably passing therethrough;
the pivoting end of the support rod of the secondary water tank inlet control valve comprising a horizontal floating plate pivoted thereto;
the water control ferrule of the secondary water tank inlet control valve comprising two water outlets formed on an edge of the water control ferrule of the secondary water tank inlet control valve and penetrating through each other, a plurality of notches formed adjacent to the two water outlets of the water control ferrule of the secondary water tank inlet control valve, and two pivoting lugs disposed between the water outlet and the notch of the water control ferrule of the secondary water tank inlet control valve;
the pivoting lug of the water control ferrule of the secondary water tank inlet control valve comprising a pivot column;
the sealing plug of the fixing end of the support rod of the secondary water tank inlet control valve being accommodated in the water control ferrule of the secondary water tank inlet control valve;
the sealing plug of the fixing end of the support rod of the secondary water tank inlet control valve comprising a water outlet, the water outlet of the sealing plug of the fixing end of the support rod of the secondary water tank inlet control valve being formed on an edge opposite to the water control ferrule of the secondary water tank inlet control valve;
the fixing hole of the fixing end of the support rod of the secondary water tank inlet control valve being configured to be opposite to the pivoting lug of the water control ferrule of the secondary water tank inlet control valve and pivotally coupled by the pivot column of the pivoting lug of the water control ferrule of the secondary water tank inlet control valve;
the fixing end of the support rod of the secondary water tank inlet control valve being slidably latched to a corresponsive notch among the plurality of notches of the water control ferrule of the secondary water tank inlet control valve;

the water control ferrule of the secondary water tank inlet control valve being fixed and coupled to the water inlet of the lower secondary water tank of the secondary water tank;

a flush control module, comprising a fixed column and a sealing-ball cover pivotally coupled to a bottom of the fixed column;

the sealing-ball cover comprising a pull string coupled thereto;

an end of the pull string being coupled to a control handle linking rod;

the fixed column being fixed into the secondary water tank;

the sealing-ball cover being configured to be opposite to the secondary water tank outlet formed on a bottom of the secondary water tank, linked and coupled to the pull string, and passed out from the air-flow column;

the control handle linking rod at the other end of the pull string being pivotally coupled to an edge near a top of a front of the primary water tank in a flipping manner.

2. The toilet tank structure according to claim 1 comprising:

the primary-secondary water tank set comprising a support stand fixed to the bottom and a rear of the primary water tank.

3. The toilet tank structure according to claim 1 comprising:

the primary water tank comprising an overflow port formed at an edge of the top of the primary water tank;

the overflow port comprising an overflow duct passed and fixed to the overflow port; and the tank cover comprising a wastewater inlet, so that when used wastewater is introduced from the wastewater inlet into the primary water tank to reuse the used wastewater, an excess supply of water in the primary water tank is guided to an outside by the overflow duct of the overflow port.

4. The toilet tank structure according to claim 1 comprising:

the upper secondary water tank cover comprising a latch engaging ring edge formed at a periphery of the upper secondary water tank and an anti-leak gasket installed to an inner side of the latch engaging ring edge; and an open edge of the lower secondary water tank and the latch engaging ring edge of the upper secondary water tank cover being latched and coupled to each other, and sealed by the anti-leak gasket for preventing leakage.

5. The toilet tank structure according to claim 1, comprising:

the lower secondary water tank and the upper secondary water tank cover being fixed and latched with each other; and the lower secondary water tank being latched with the upper secondary water tank cover by a fixing latch.

6. The toilet tank structure according to claim 1 comprising:

the tank cover comprising a basin portion and a faucet disposed at a top of the tank cover, a telescopic pipe disposed at a bottom of the basin portion, a plurality of slides disposed at a rear of the tank cover, a plurality of hinge plates disposed on a rear edge of the top of the tank cover, and a plurality of rails disposed at a top of a support stand of the primary-secondary water tank set;

the plurality of slides and the plurality of rails being slidably coupled to each other;

the other end of the plurality of hinge plates disposed at a rear side of the top of the tank cover being fixed and coupled to a rear side of the rail, so that the tank cover is capable of being moved transversally sideway and lifted backward; and in response to the tank cover being moved transversally, the telescopic pipe being pulled to recycle wastewater in the primary water tank.

\* \* \* \* \*